Feb. 1, 1944. B. COOPER 2,340,581
CALCULATING MACHINE
Filed Jan. 9, 1941 9 Sheets-Sheet 1
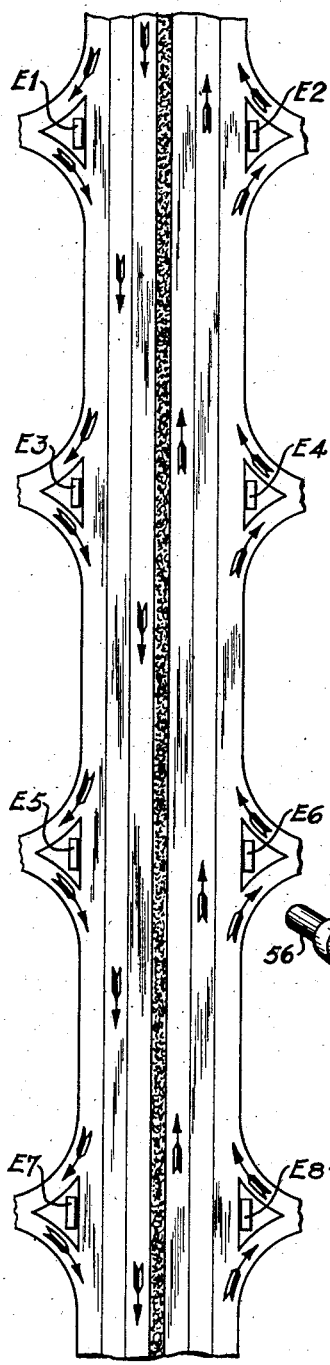
FIG.1
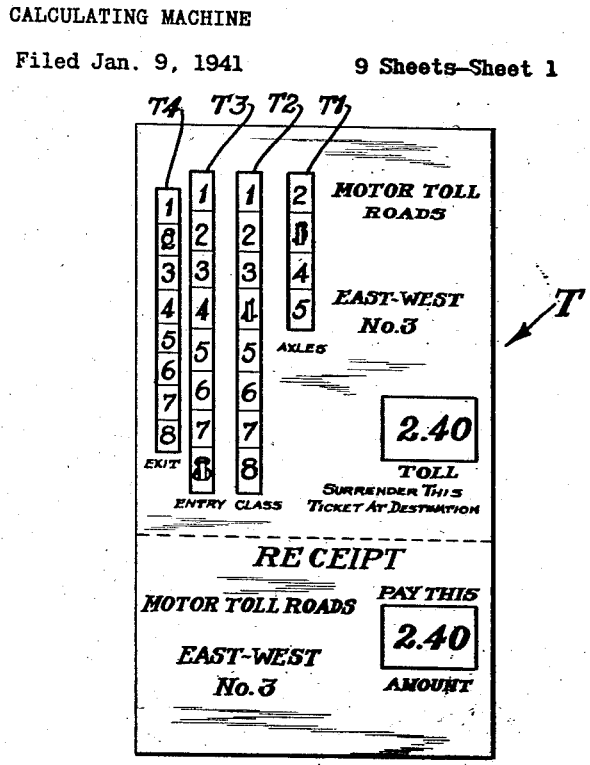
FIG.2
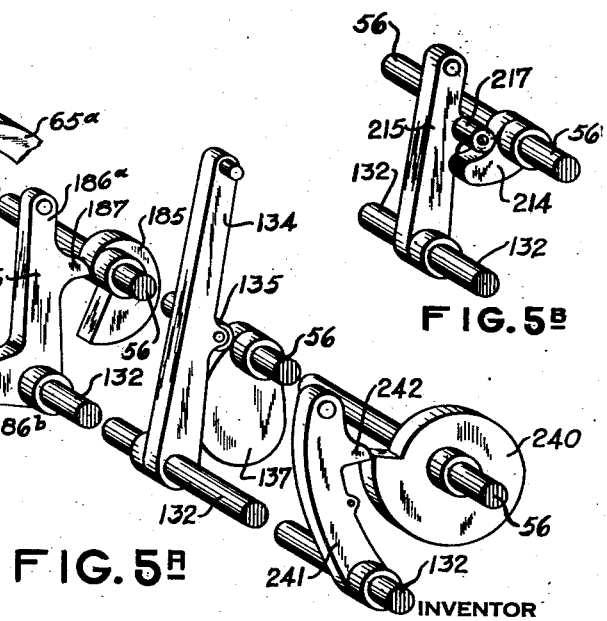
FIG.5<sup>A</sup>
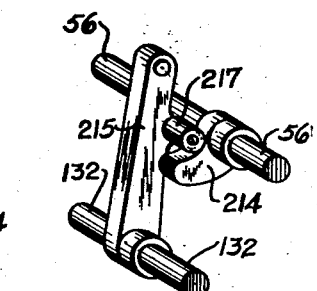
FIG.5<sup>B</sup>
INVENTOR
BENJAMIN COOPER
BY
J.B. Felshin
ATTORNEY Feb. 1, 1944.    B. COOPER    2,340,581
CALCULATING MACHINE
Filed Jan. 9, 1941    9 Sheets-Sheet 2

INVENTOR
BENJAMIN COOPER
BY J.B. Felshin
ATTORNEY

Feb. 1, 1944.   B. COOPER   2,340,581
CALCULATING MACHINE
Filed Jan. 9, 1941   9 Sheets-Sheet 3
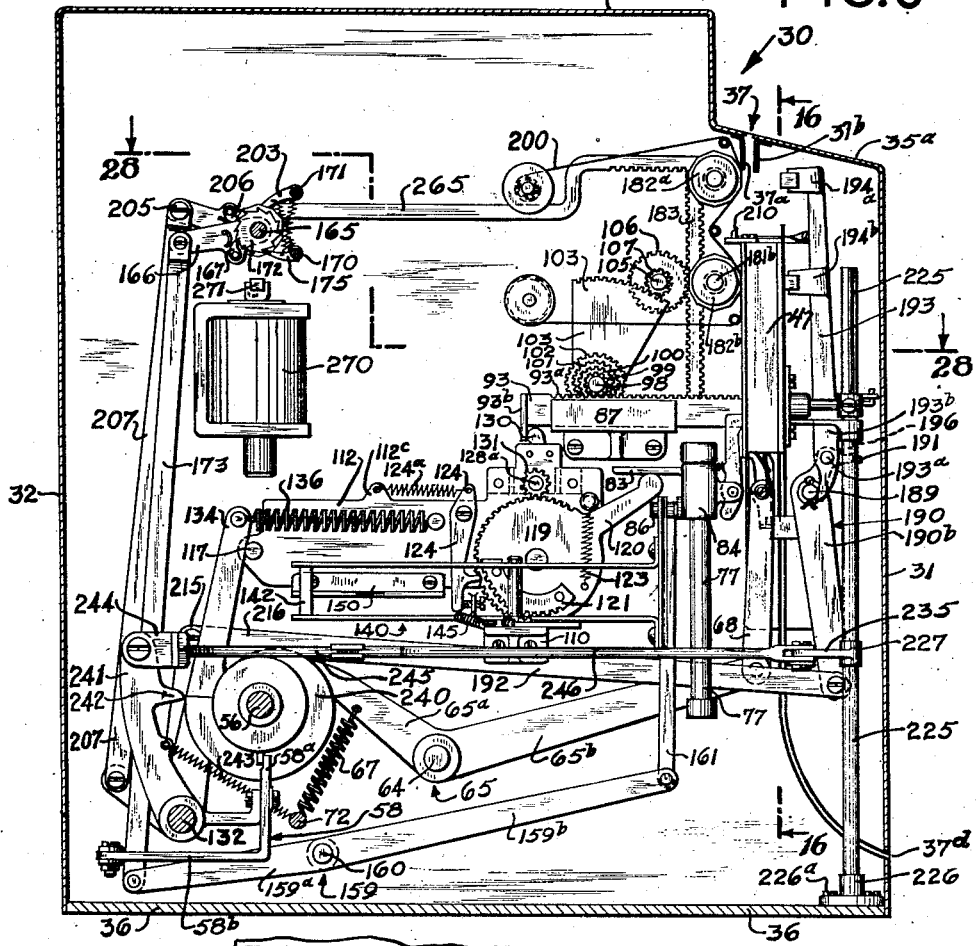
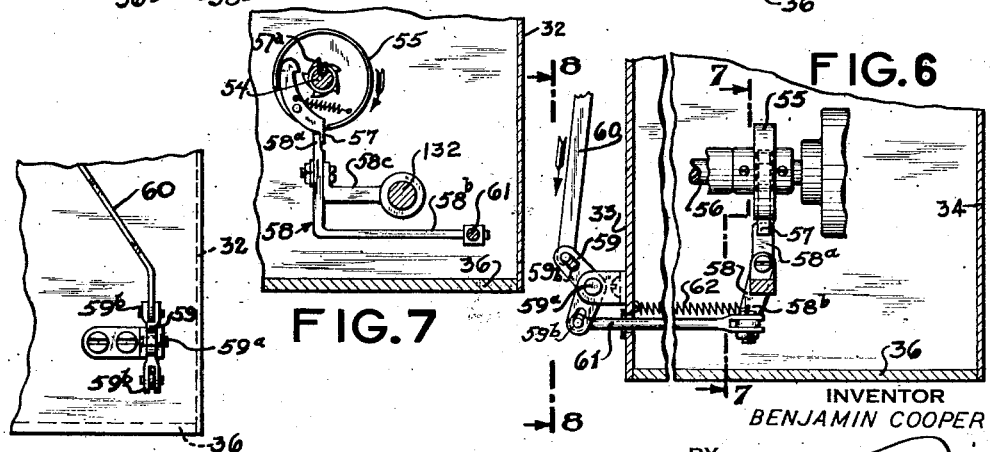
INVENTOR
BENJAMIN COOPER
BY J. B. Felshin
ATTORNEY Feb. 1, 1944. B. COOPER 2,340,581
CALCULATING MACHINE
Filed Jan. 9, 1941 9 Sheets-Sheet 4

INVENTOR
BENJAMIN COOPER
BY
ATTORNEY

Feb. 1, 1944. B. COOPER 2,340,581
CALCULATING MACHINE
Filed Jan. 9, 1941 9 Sheets-Sheet 5
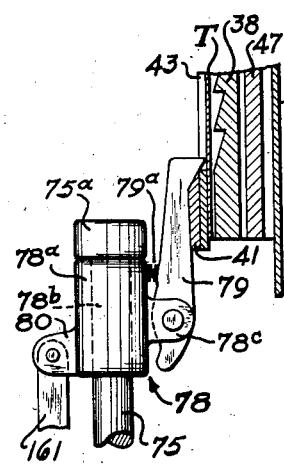
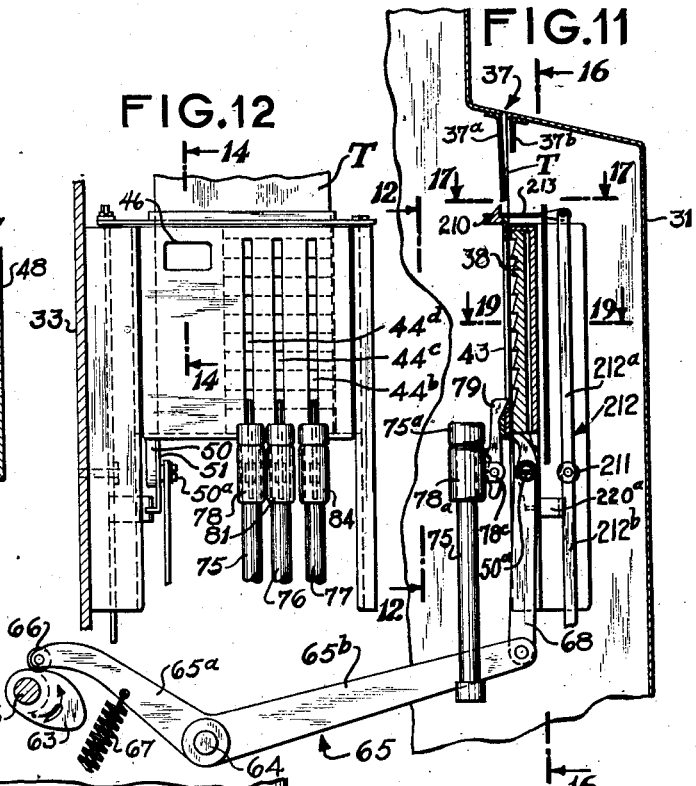
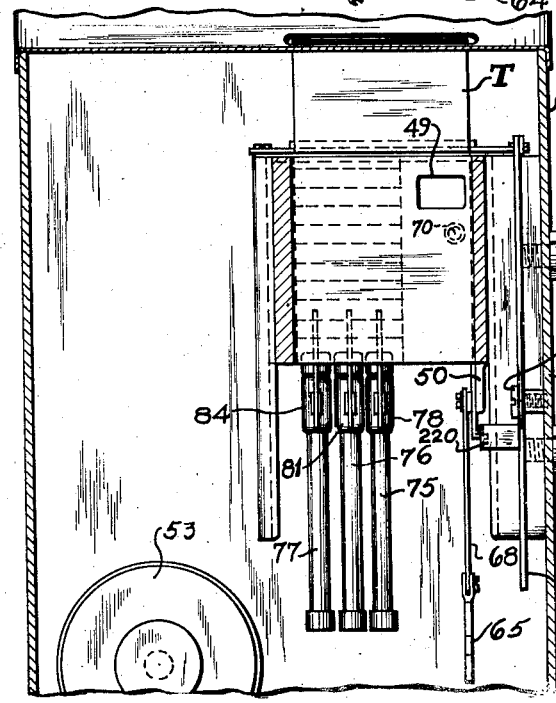
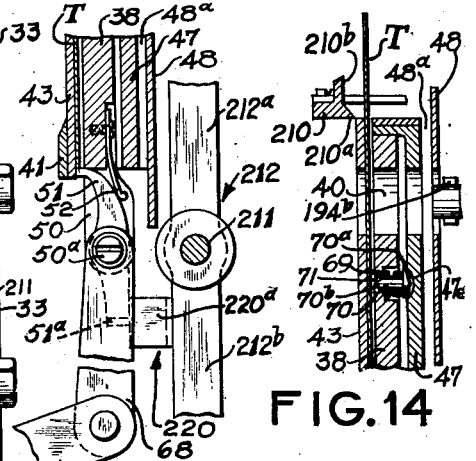
INVENTOR
BENJAMIN COOPER
BY J. B. Felshin
ATTORNEY

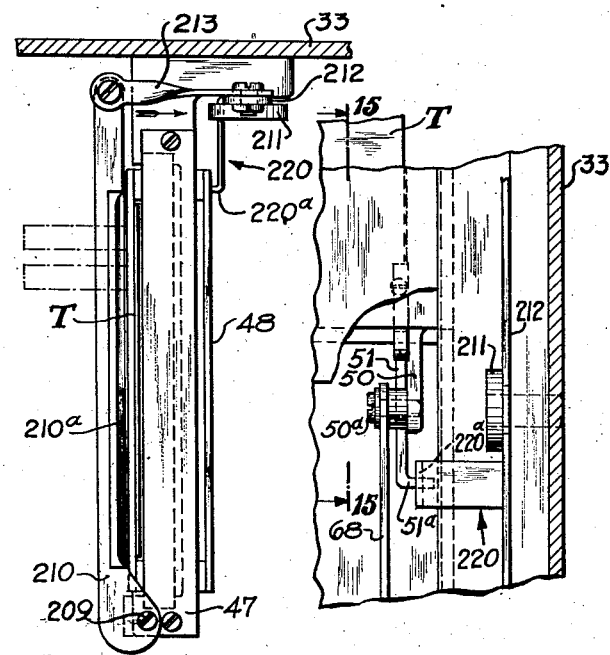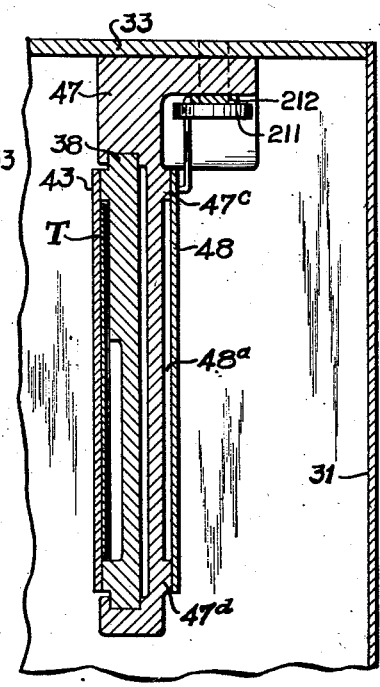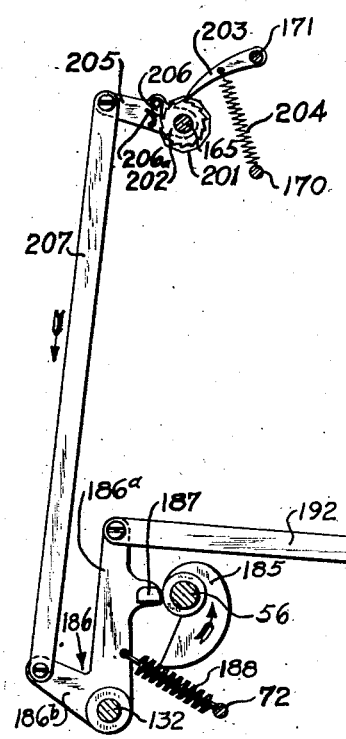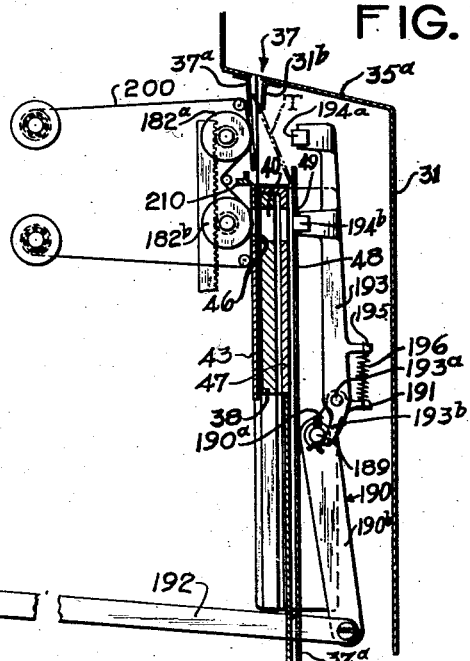

Feb. 1, 1944.　　　　　B. COOPER　　　　2,340,581
CALCULATING MACHINE
Filed Jan. 9, 1941　　　9 Sheets-Sheet 7
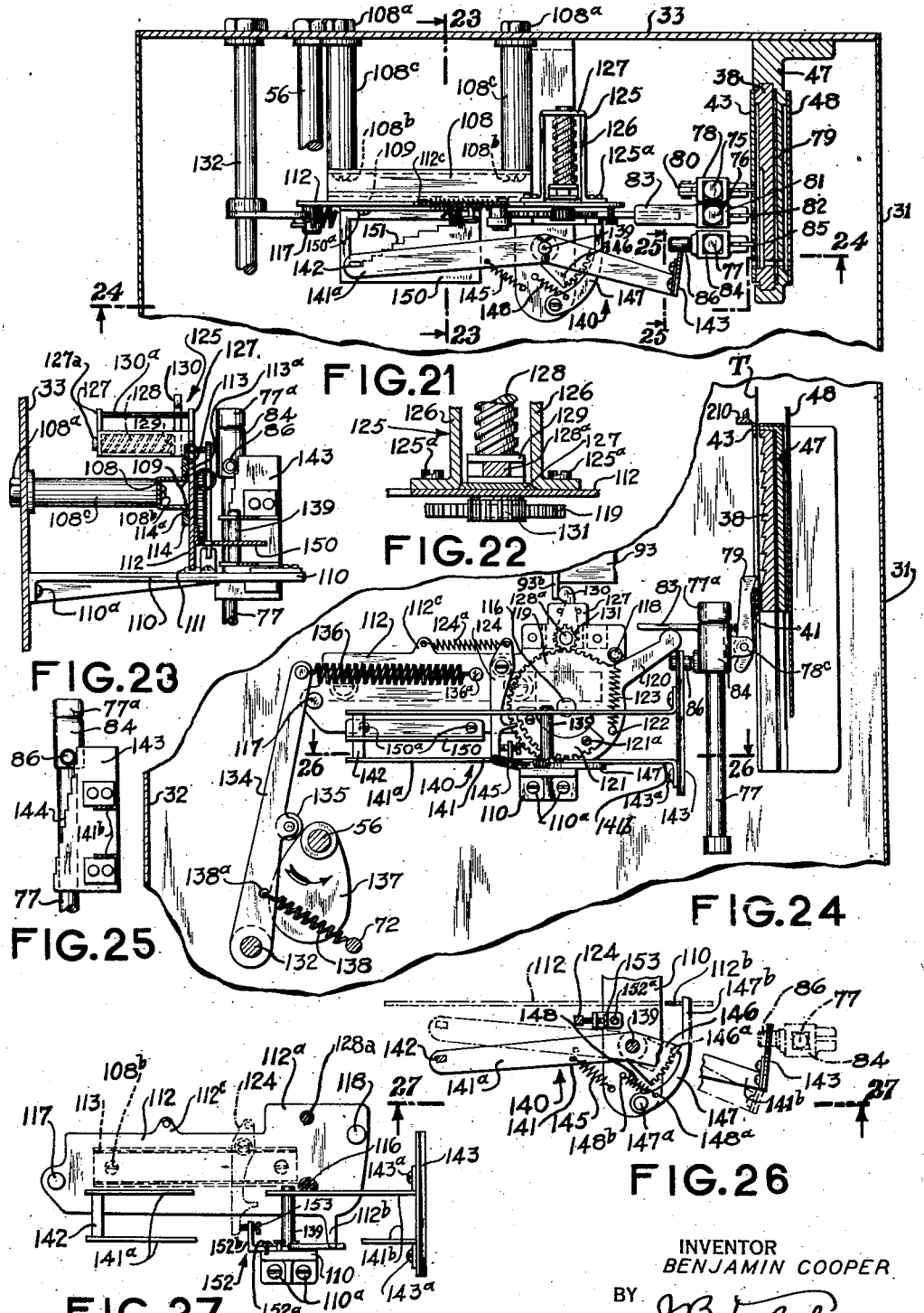
INVENTOR
BENJAMIN COOPER
BY
J. B. Felshin
ATTORNEY Feb. 1, 1944.     B. COOPER     2,340,581
CALCULATING MACHINE
Filed Jan. 9, 1941     9 Sheets-Sheet 8
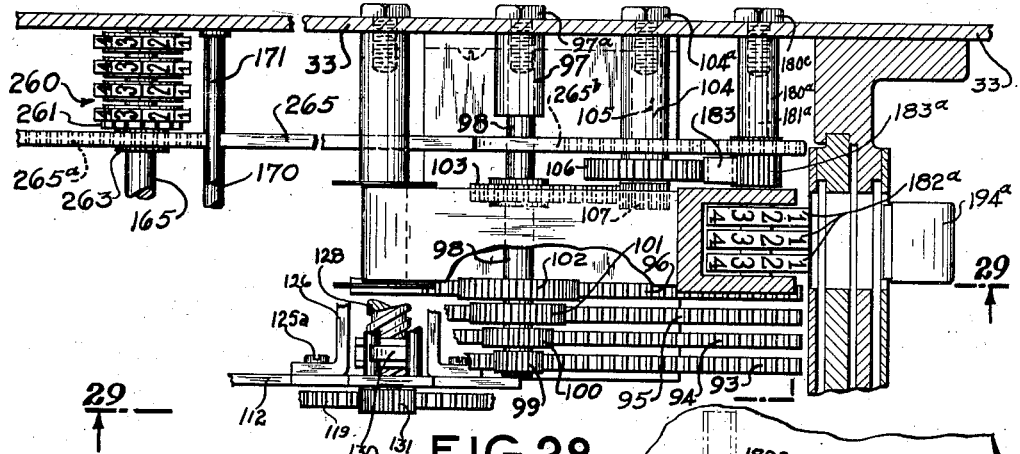
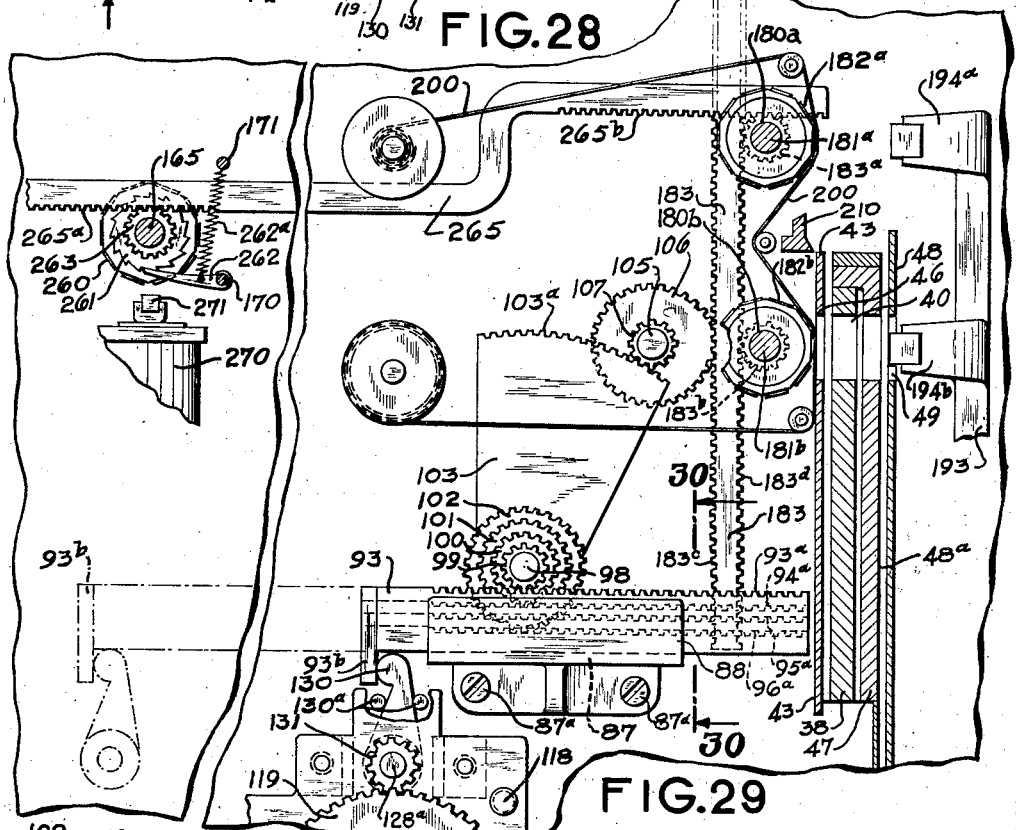
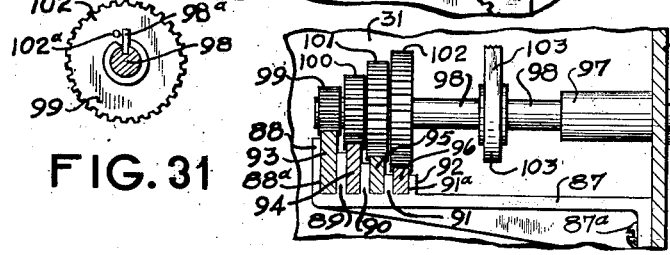
INVENTOR
BENJAMIN COOPER
BY J.B. Felshin
ATTORNEY Feb. 1, 1944.  B. COOPER  2,340,581
CALCULATING MACHINE
Filed Jan. 9, 1941  9 Sheets-Sheet 9

INVENTOR
BENJAMIN COOPER
BY J.B. Felshin
ATTORNEY

Patented Feb. 1, 1944

2,340,581

UNITED STATES PATENT OFFICE 2,340,581

CALCULATING MACHINE

Benjamin Cooper, Jersey City, N. J.

Application January 9, 1941, Serial No. 373,737

12 Claims. (Cl. 235—61.6)

This invention relates to calculating machines. It is particularly directed to calculating machines used to compute and record the toll fares of vehicles on toll highways. It may also be adapted to compute passenger or freight fares on railroads, bus and truck lines, and airlines; as well as wages based upon an hourly wage rate. The disclosure hereinafter made is limited to a calculating device for computing and recording the toll fares of vehicles on toll highways, illustrative of this invention.

Modern express highways are constructed so that vehicles desiring to enter or leave the roadway must do so through fixed points of entrance or exit. Since an express highway may extend a hundred miles or more, there are usually many such exit and entrance stations located at miscellaneous points along the highway, their location being strategically determined to provide convenient access to the turnpike from the various business and commercial centers in the area.

In highways of this type, the toll charge for vehicles using the highway is often dependent upon the distance traveled by the vehicle along the roadway, the fare being determined by multiplying the distance by a base fare per mile.

It is also the usual policy to charge different base rates for the various types of vehicles. For example, a bus may be required to pay a higher toll per mile than a truck, and a truck a higher toll than a passenger car, etc. Accordingly, each type of vehicle has an individual base rate per mile. All types having the same base rate are grouped together to form a rate classification. The toll charge is consequently computed by multiplying the distance traveled along the highway by the base rate corresponding to the classification into which the vehicle falls.

It is an object of this invention to provide in a system for collection and checking of the toll receipts on a highway of the character described, means to automatically compute the toll of each individual vehicle. Said toll computation system comprises the issuance of a tag, ticket, or token to each vehicle as it enters the highway, the token bearing suitable indicia for identifying the station through which the vehicle entered. Upon leaving the highway the token is collected by the attendant at the exit and inserted in a toll computing machine, where the toll fare is automatically computed and recorded.

It is a further object of this invention to provide an automatic toll computing machine controlled by an identifying token inserted therein for automatically computing the fare to be charged the driver of the vehicle.

It is still a further object of this invention to provide in a toll computing machine of the character described automatic means for adding the individual fares determined by the various tokens inserted therein, for checking the sum total of all the toll fares which were collected.

It is a further object of this invention to provide in a toll computing machine of the character described, means controlled by suitable indicia on the tokens for obtaining a total count of the axles on all vehicles for which tokens have been inserted into the computing machine. Said total axle count may then be compared to the axle count obtained from a roadway axle counter such as described in my Patent No. 2,166,090, to assure that a token is inserted into the toll computing machine each time a vehicle exits the highway. Thus, a toll collector will be prevented from yielding to the temptation to collect the toll without registering his collection on the toll computing machine.

In the embodiment of the invention described herein, the token comprises a cardboard ticket, the toll computing machine embodying the invention having means for automatically printing on said ticket the toll fare computed by the machine.

It is still another object of this invention to provide in a toll computing machine of the character described means for severing the ticket within the machine after the fare is computed and printed thereon so that a portion of each ticket containing the identifying indicia is deposited within a locked ticket drawer whereas the stub portion having the fare printed thereon is re-issued from the machine for presentation to the driver as a receipt.

Still another object of this invention is to provide a toll computing machine of the character described which shall be relatively inexpensive to manufacture, positive in operation, and yet practical and efficient to a high degree in use.

Other objects of this invention will in part be obvious and in part be hereinafter pointed out.

The invention accordingly consists in the features of construction, combination of elements and arrangement of parts which will be exemplified in the construction hereinafter described and of which the scope of application will be indicated in the following claims.

Fig. 1 is a top plan view showing a section of an express turnpike with which the toll collection system, embodying the invention may be used;

Fig. 2 illustrates a typical token or ticket which is issued the vehicle driver as he enters the highway and which is inserted in the toll collecting machine embodying the invention when the driver leaves the highway;

Fig. 5 is a cross-sectional view taken on line 5—5 of Fig. 3;

Fig. 5a is a perspective view showing the initial position of the operating cams and their respective followers.

Fig. 5b is a perspective view of the ticket cutter cam and its follower in initial position.

Fig. 6 is a cross-sectional view taken on line 6—6 of Fig. 3;

Fig. 7 is a cross-sectional view taken on line 7—7 of Fig. 6;

Fig. 8 is a side elevational view of the motor starting mechanism, shown in Fig. 6 looking along lines 8—8 of Fig. 6.

Fig. 11 is a cross-sectional view taken on line 11—11 of Fig. 3;

Fig. 12 is a sectional view taken on line 12—12 of Fig. 11;

Fig. 13 is an enlarged view the pawl mechanism;

Fig. 14 is an enlarged, cross-sectional view taken on line 14—14 of Fig. 12;

Fig. 15 is a cross-sectional view taken on line 15—15 of Fig. 18;

Fig. 16 is a cross-sectional view taken on line 16—16 of Figures 5 and 11;

Fig. 17 is a cross-sectional view taken on line 17—17 of Fig. 11;

Fig. 18 is an enlarged view of the ticket releasing mechanism shown in Fig. 12;

Fig. 19 is a cross-sectional view taken on line 19—19 of Fig. 11;

Fig. 20 is a cross-sectional view taken on line 20—20 of Fig. 3;

Fig. 21 is a cross-sectional view taken on line 21—21 of Fig. 4;

Fig. 22 is an enlarged view of the spiral mechanism shown in Fig. 21;

Fig. 23 is a cross-sectional view taken on line 23—23 of Fig. 21;

Fig. 24 is a cross-sectional view taken on line 24—24 of Fig. 21;

Fig. 25 is a cross-sectional view taken on line 25—25 of Fig. 21;

Fig. 26 is a cross-sectional view taken on line 26—26 of Fig. 24;

Fig. 27 is a cross-sectional view taken on line 27—27 of Fig. 26;

Fig. 28 is a cross-sectional view taken on line 28—28 of Fig. 5;

Fig. 29 is a cross-sectional view taken on line 29—29 of Fig. 28;

Fig. 30 is a cross-sectional view taken on line 30—30 of Fig. 29;

Fig. 31 is a cross-sectional view taken on line 31—31 of Fig. 30;

Referring now in detail to the drawings, Fig. 1 schematically illustrates a toll highway comprising a plurality of entrance and exit stations, E1, E2, E3, E4, etc. When a vehicle enters the highway the driver is issued a ticket T (Fig. 2) by the attendant at the station. Said ticket has printed thereon four vertical columns T1, T2, T3, and T4 of figures representing respectively the number of axles of the vehicle, the classifications thereof, identifying numbers of the stations of entrance, and identifying numbers of the exit stations. The columns T1, T2, T3 each have one figure thereof perforated, the perforated numbers corresponding respectively to the number of axles on the vehicle to which the ticket is issued, the classification number, and the identifying number of the station issuing the ticket. Since the destination of the driver is unknown, the exit station column T4 is unperforated when the ticket is issued, and is perforated when the driver exits, as will appear hereinafter. Thus, when the vehicle leaves the highway, the ticket is surrendered to the collector at the exit, who inserts said ticket into the toll computing register C, embodying the invention.

Figures 3, 4:
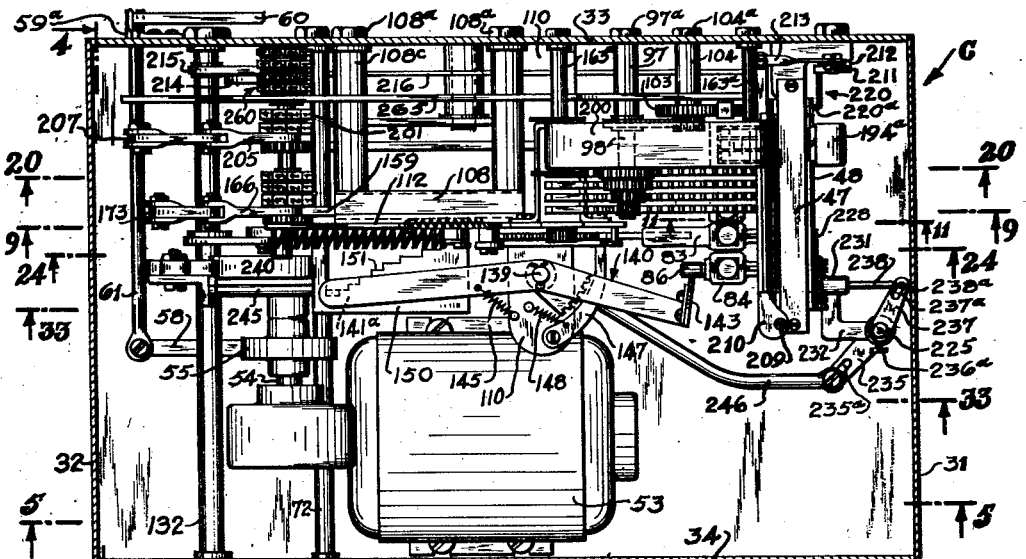
Fig. 3 is a top plan view of the toll collecting machine embodying the invention, taken below the cover thereof.
Fig. 4 is a cross-sectional view taken on line 4—4 of Fig. 3.

Referring now to Figures 3, 4, and 5, the toll register C comprises a casing 30, having a front wall 31, a rear wall 32, side walls 33, 34, a top wall 35, having a ledge 35a, and a base 36. The top wall ledge 35a is formed with a slot 37, through which the ticket T is inserted into the machine; and front wall 31 is formed with a slot 37d through which the printed receipt portion of ticket T is delivered.

Figure 10:
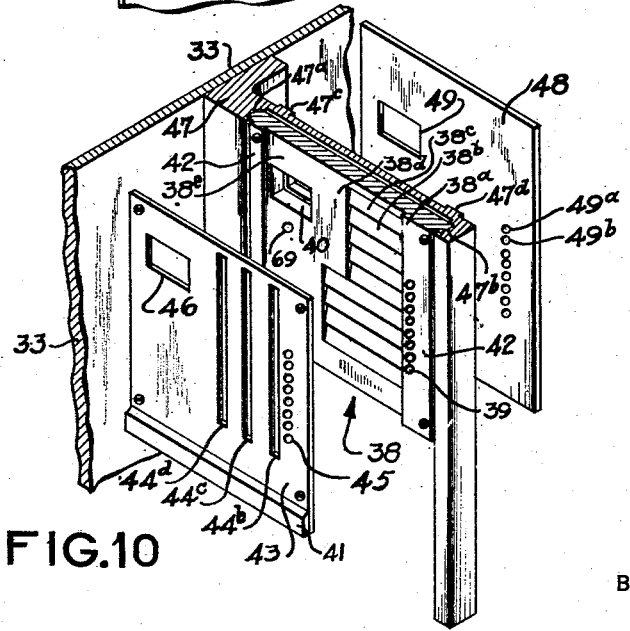
Fig. 10 is a perspective, exploded view of the ticket receiving rack.

Located within the casing 30 and fastened to the side wall 33 directly beneath the slot 37 is a frame 47 having a pair of grooves 47a, 47b (Figs. 5 and 10). Slideably received within the grooves 47a, 47b, of frame 47 is a vertical ratchet plate 38. The plate 38 is divided into five sections 38a, 38b, 38c, 38d, 38e, of which the sections 38b, 38c, 38d are formed with vertical rows of transversely continuous ratchet teeth.

The section 38b has its steps or teeth formed to correspond to the entrance station column T3 of the ticket T, there being a step for each station on the highway. The vertical distance between steps of ratchets 38b, 38c, 38d are equal to the vertical distance between the numbers of the corresponding columns in the ticket. Furthermore, the widths of the steps are equal to the widths of the corresponding columns.

Similarly, the section 38d of the plate 38 corresponds to the axles column T1 of the ticket, and has four steps arranged similar to the axle numbers on the ticket.

The section 38c is similarly formed to correspond to the classification column T2 of the ticket, there being as many steps as there are classifications, the spacing of said steps corresponding to the spacing of the numbers of column T2.

The section 38a of the plate 38 is formed with a plurality of aligned holes 39, there being one hole for each exit number in column T4 of the ticket T. The holes 39 are spaced apart corresponding to the spacing of the numbers on column T4.

The section 38e of the plate 38 has a rectangular aperture 40, cut from near the top portion.

Rigidly fastened to plate 38, and spaced away therefrom by means of the ridges 42 is a parallel plate 43, formed with three vertical slots 44b, 44c, 44d, positioned in alignment with the sections 38b, 38c, 38d, of plate 38, respectively. Said plate 43 also has a column of holes 45, registering with holes 39, there being one for each of the holes 39, aligned therewith. Plate 43 is also formed with an aperture 46 aligned with aperture 40 in plate 38.

The frame 47 also has a pair of vertical ridges 47c, 47d to which is fastened a backing plate 48, forming a slot 48a therewith and having its upper edge slightly higher than the upper edges of plate 38 at frame 47. The plate 46 is formed with an aperture 49 aligned with the apertures 40 and 46 of the plates 38 and 43 respectively. Said plate 48 is also provided with a plurality of holes 49a, 49b etc., registering with the holes 39 and 45 of plates 38 and 43, respectively, in the "up" position of plate 38. For the purposes hereinafter appearing, the plate 43 has affixed to its lower end a stop plate 41 (Figs. 10, 13, and 15).

It will be understood that the ratchet plate 38 having a plate 43 attached thereto, is slideably movable in a vertical direction within the grooves 47a, 47b, whereas the backing plate 48 remains fastened to the frame 47. When said ratchet plate 38 is at its top position, openings 39 and the aperture 40 are aligned with openings 49a, 49b and aperture 49 of the backing plate 48, respectively.

When a ticket T is inserted within the slot 37 it is positioned by the walls 37a and 37b of said slot into the space between the plates 38 and 43, as illustrated in Figs. 11 and 12.

Referring to Fig. 15, the ratchet plate 38 has attached to its bottom end an ear 50 having a horizontally extending stud 50a adjacent its bottom portion. Pivotally mounted to said ear 50, on the stud 50a, is a pawl 51 having an outwardly extending ear 51a. Pawl 51 is held by a leaf spring 52 in engagement with the plate 43, thereby providing a stop for preventing the ticket T from falling completely through the opening between the plates 38 and 43.

Referring to Fig. 2, the ticket T is inserted within the slot 37 so that the top side of the ticket enters the slot first. The stop pawl 51 is positioned so that when the top edge of the ticket T engages said pawl, the columns T1, T2, T3, and T4 on the ticket T, are aligned with the slots 44d, 44c, 44b and the holes 45 of the plate 43, respectively.

Referring now to Figures 3, 4, 6, 7, and 8, there is provided within the casing 30 and mounted on the bottom wall 36 a motor 53 having an output shaft 54 connected to a one revolution clutch 55. The other end of said clutch is connected to a horizontal shaft 56, the other end of which is journalled in wall 33.

The one revolution clutch may be of any well-known type having an actuating pawl 57 adapted to engage a ratchet wheel 57a fixed on shaft 54. Fixed within said casing 30 as on shaft 132 by a bracket 58c is a lever 58 having an upwardly extending arm 58a adapted to engage the pawl 57 and a horizontal arm 58b. Pivoted to the outside of wall 33, as at 59a, is an actuating lever 59 having one arm thereof connected by a pin and slot connection 59b to the lower end of a rod 60. Rod 60 extends upwardly along the outside of wall 33, carrying an actuating button 60a at its upper end adjacent the top of casing 30, suitable guides being provided to permit said push button to be depressed. The other arm of lever 59 is connected by a second pin and slot connection 59b to a horizontal link 61 passing through wall 33 and pivoted to arm 58b of lever 58.

Referring to Fig. 6 it will be seen that when rod 60 is lowered, the link 61 is moved to the right (Figs. 4 and 6), rotating the arm 58a counter-clockwisely and releasing the ear 57, and thereby actuating clutch 55, and permitting shaft 56 to be rotated. When the link 60 is released, a spring 62 connected between the arm 58b and the side wall 33, returns lever 58 clockwisely (Fig. 6) so that as the shaft 56 completes one revolution, the ear 57 will be reengaged by the arm 58a thereby disengaging the clutch 55 and stopping the shaft 56.

It will therefore be seen that each time the link 60 is depressed, the shaft 56 makes one revolution.

Referring now to Figures 5 and 11, rigidly mounted on shaft 56 is a cam 63 adjacent to wall 33. Also rigidly fastened to the side wall 33 is a stud 64 and pivotally mounted thereon is a lever arm 65 having a rearwardly extending arm 65a. Said arm 65a carries at its outer end a cam follower 66 adapted to engage the periphery of cam 63. A coil tension spring 67 fixed to said arm and to a rod 72 affixed between side walls 33 and 34 (Fig. 5) holds said cam follower in engagement with said cam. The forwardly extending arm 65b of lever 65 has its outer end connected by link 68 to stud 50a, said stud being rigid to ratchet plate 38 as heretofore explained.

Referring to Fig. 11, it is seen that when shaft 56 is rotated in a counter-clockwise direction as heretofore explained, cam 63 rocks lever 65 clockwisely about its pivot 64, moving link 68 downwisely. The ratchet plate is accordingly lowered and the ticket T is moved downwardly with the frame. When the reversing portion of the cam 63 passes the cam follower 66 spring 67 returns the lever 65 counter-clockwisely, and the ratchet plate 38 is returned upwardly for purposes hereinafter appearing.

Referring now to Fig. 14, the ratchet plate 38 is formed with a through opening 69 having an enlarged portion and located beneath the aperture 40 of said plate. Received within said opening 69 is a pointed stud 70, having a rounded head 70a and a tapered point 70b. Inserted in the enlarged end of opening 69 and contacting the head 70a is a coil compression spring 71 normally urging said stud to the right, looking at Fig. 14. The back portion of the plate 47 is formed with a recess 47e for receiving the head 70a and permitting the point 70b of the stud 70 to be withdrawn within the plate 38. However, when said plate 38 is moved downwardly as heretofore described, the head 70a is moved out of the recess 47e forcing the stud 70 to the left against the pressure of spring 71. As said stud 70 moves to the left, its point 70b pierces the inserted ticket T, preventing any relative motion between said inserted ticket and the ratchet plate 38. When the plate 38 is returned upwardly as heretofore described, the stud 70 again aligns with the recess 47e permitting said stud to be moved to the right by the spring 71 and disengaging the point 70b from the ticket T.

It will thus be seen that when a ticket is inserted within the machine and the operating button depressed said ticket is moved downwardly, simultaneously with the ratchet plate 38, and any relative movement between said ticket and said plate is prevented by the stud 70. When the ratchet plate 38 is returned upwardly to its original position the ticket T becomes disengaged from the plate 38 to permit removal of said ticket, as will hereinafter be described.

Means is provided to compute the toll fare corresponding to the perforations on the ticket T. As heretofore explained, said fare is determined by multiplying the distance travelled by the vehicle along the highway by the base fare per mile corresponding to the classification in which the vehicle falls. On the ticket, the position of perforation in column T2 determines the base rate, and the position of the perforation in column T3 determines the point of entrance of the vehicle onto the highway.

The toll fare computing means comprises generally a number of devices corresponding to the number of base rates or positions of the perforation in column T2, each having a size corresponding to the value of the base rate, and means to select one of said devices depending upon the position of the perforation in the column T2, and means to actuate the selected device a degree depending upon the position of the perforation in column T3 to cause a movement of any part to a degree dependent upon both the value of the base rate and the entrance position of the vehicle on the highway (or distance travelled by said vehicle).

The toll fare computing means also comprises mechanism for adding up the total number of axles of vehicles passing the exit point. Said adding means constituting generally of mechanism actuated by each ticket inserted into the calculator to a degree dependent upon the position of the perforation in column T1 of the ticket. Thus, each ticket inserted into the machine will actuate mechanism to a degree dependent upon the position of the perforation in the ticket, so that the total movement of the mechanism will depend upon the total number of axles of vehicles passing the exit point.

To this end, referring to Figs. 5, 12, and 16, there are provided within the casing 30, three vertical standards 75, 76, and 77, located directly behind and beneath the slots 44d, 44c, and 44b, respectively, of the ticket frame 47, said standards terminating in the caps 75a, 76a, and 77a, respectively.

Slideably mounted on standard 75 is a pawl block 78, Fig. 13. Said block 78 comprises a body portion 78a having a vertical through opening 78b within which the standard 75 is slideably received. Extending forwardly from said block 78 is an ear 78c, on which is pivotally mounted a pawl 79 normally urged to rotate in a clockwise direction by a spring 79a interposed between said pawl and the block 78. Extending rearwardly from the block 78 for purposes hereinafter appearing, is an ear 80.

Mounted on standard 76 is a similar block 81 similarly carrying a pawl 82, and having a rearwardly extending shelf 83, replacing the ear 80 of block 78.

Standard 77 similarly carries a block 84 having a similar pawl 85 and rearwardly extending roller 86.

For the purposes hereinafter appearing, pawl 79 is referred to as the axle pawl, pawl 82 as the classification pawl, and pawl 85 as the distance pawl.

The pawls 79, 82, and 85, due to the action of their respective compression springs, abut a stop plate 41 affixed to the lower edge of plate 43 (Fig. 13). As ratchet plate 38 is lowered in the manner previously described, stop plate 41 is also lowered, thus freeing the pawls 79, 82, and 85 and permitting them to move into the vertical slots 44d, 44c, and 44b, respectively, in plate 43, the ends of said pawls riding over the surface of the ticket T. As the punched holes in columns T1, T2, and T3 of the ticket are reached, the respective pawls will pass through the punched holes and become engaged by the ratchet edges of the ratchet plate 38 corresponding thereto. The pawl blocks 78, 81, and 84 are thus carried downwardly over their respective standards until the downward limit of the ratchet plate 38 has been reached. The distance traveled downwardly by pawl blocks thus depends upon the positions of the perforations in columns T1, T2, and T3.

In moving the ratchet plate 38 upwardly, as previously described, pawls 79, 82, and 85 are disengaged by said ratchet plate and slip out of the punched holes in ticket T. As the stop plate 41 passes the pawls, said pawls are engaged by the stop plate, and due to the lack of clearance between said stop plate and the pawl blocks 78, 81, and 84, pawls 79, 82, and 85 are carried upwardly therewith, to their initial position.

Pawl 79, or the axle pawl, registers the number of axles as represented by the punched holes in column T1 of the ticket.

Figure 9:
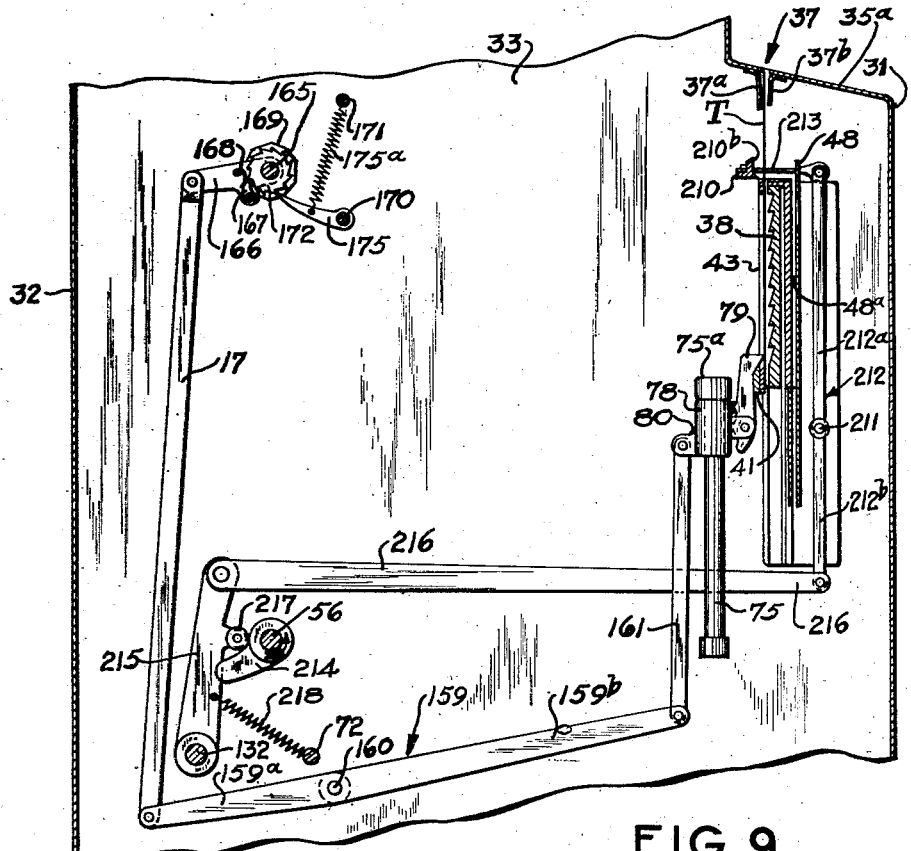
Fig. 9 is a cross-sectional view taken on line 9—9 of Fig. 3.

Referring to Figs. 4 and 9 of the drawings, there is accordingly provided a lever 159 pivoted within the casing 30, as at 160, having arms 159a and 159b. Pivotly mounted to the end of arm 159b is the upwardly extending link 161, the upper end of which is pivoted to ear 80 of the pawl block 78.

Affixed at the upper end of wall 33, as by screws 163a, is a plate 163, parallel to said side wall and spaced therefrom by sleeves 164. Fixed to wall 33 and plate 163 is a shaft 165, perpendicular to said side wall and parallel to the shaft 56. There is further affixed to the side wall 33 and plate 163 two rods 170 and 171, parallel to the shaft 165 for the purpose hereinafter appearing.

Rotatably mounted on shaft 165 are digit wheels 169, provided with suitable transfer gears. Rotatably mounted with the units wheel of the wheels 169 is a ratchet wheel 172. A stop pawl 175 is mounted on rod 170 and held in engagement with ratchet wheel 172 by a coil tension spring 175a fixed to said stop pawl and the rod 171. Pivoted on shaft 165 is an arm 166 having an actuating pawl 167 mounted thereon, and held in engagement with the ratchet 172 by a leaf spring 168 also mounted on arm 166. Pivoted to the free end of arm 166 is a link 173, the lower end of which is pivoted to arm 159a of the lever 159.

In lowering the ratchet plate 38, and the ticket T, the axle pawl will be engaged by said ratchet plate, as previously described, thus lowering pawl block 78 a predetermined distance based on the position of the punched hole of the ticket, indicating the number of axles of a vehicle. Link 161 is thus moved downwardly rotating the lever 159 in a clockwise direction about its pivot 160 (Fig. 9). Link 173 is thereby moved upwardly, rotating arm 166 in a clockwise direction about shaft 165. Actuating pawl 167 will thus rotate the ratchet wheel 172 in a clockwise direction, advancing the digit wheels 169 a number of steps corresponding to the number of axles indicated on the ticket T.

Returning the ratchet plate 38 to its initial position will return the axle pawl to its initial position. Lever 159 will thus be rotated in a counterclockwise rotation, rotating arm 166 in the same direction to its initial position, the stop pawl 175 preventing any counterclockwise rotation of the digit wheels 169.

Thus digit wheels 169 register the total number of miles, to give the toll a given vehicle is re a highway.

By operation of pawl 82, or the classification pawl, the base rate per mile which a particular vehicle is required to pay is selected and set up in the toll register C as the multiplier, to be used by a further operation, as will hereinafter be described, to multiply the multiplicand, or number of miles, to give the toll a given vehicle is required to pay.

Referring, therefore, to Figs. 28 to 30, there is provided a plate 87 affixed to side wall 33 as by screws 87a, said plate being parallel with the base 36 and provided with upwardly extending shoulders 88, 89, 90, 91, and 92, forming grooves 88a, 89a, 90a, and 91a. For the purposes hereinafter appearing there is slideably mounted in said grooves the racks 93, 94, 95, and 96, having teeth 93a, 94a, 95a, and 96a, respectively, and provided with the depending projections 93b, 94b, 95b, and 96b, respectively.

Fixed to side wall 33, as by screw 97a, is a bearing 97. Journaled within said bearing and perpendicular to wall 33 is a shaft 98. Rotatably mounted on said shaft are four pinions 99, 100, 101, and 102, meshing with racks 93, 94, 95, and 96, respectively. The diameters of these pinions vary in accordance with the ratios between the base rates. Affixed to the face of each of the pinions and perpendicular thereto are pins 102a. Affixed to shaft 98 are four pins 98a, a pin being provided for each pinion. Pins 98a are so affixed to shaft 98 as to be engaged by the pins 99a, 100a, etc., upon rotation of the pinions in a clockwise direction (Fig. 31) to rotate shaft 98 in the same direction. Affixed to the shaft 98 is a gear sector 103, having teeth 103a.

It is to be noted that while four pinions meshing with their respective racks are described, a pinion and rack is to be provided for each of the base rates provided on the ticket T.

For purposes hereinafter appearing, there is fixed to side wall 33, as by screws 104a, a bearing 104, placed above and to one side of the bearing 97. Journaled in bearing 104 is a shaft 105 parallel to the shaft 98, and carrying a gear 106 and a pinion 107. Pinion 107 is so fixed to shaft 105 as to mesh with the teeth 103a of the gear sector 103. Pinion 107 will thus rotate shaft 105 and the gear 106.

Referring now to Figs. 21 to 27, inclusive, there is fixed to the side wall 33, and under plate 87, as by screws 108a and 108b, and by spacer rods 108c, a U-shaped member 108, provided with flanges 109 parallel with said side wall. Fixed to wall 33, as by screws 110a, and under said U-shaped member, is a plate 110, parallel with the base 36, and provided with a keyed portion 111. Splined in the keyed portion 111 is a carriage 112, perpendicular to plate 110 and parallel to side wall 33.

Carriage 112 is provided with two lateral strips 113 and 114 on the side adjacent wall 33, said strips being cut away to form the grooves 113a and 114a, respectively, to receive the flanges 109 of the U-shaped member 108. Carriage 112 is thus supported by the plate 110 and the U-shaped member 108, and is adapted to be slideably moved from right to left. Fig. 24 shows the initial position of the carriage 112.

Carriage 112 is provided with an upward extending portion 112a, having a through opening 115. Beneath the opening 115 is another through opening 116. Carriage 112 is also provided with a depending arm or stop 112b, an upwardly extending projection 112c, and two studs 117 and 118.

Rotatably mounted in the opening 116 is shaft carrying a gear 119, having an upwardly extending arm 120. On the face of gear 119 is fixed, as by screws 121a, a segmental gear plate 121, and a stud pin 122. Interconnecting the stud pin 122 and stud 118 of the carriage 112 is a coil tension spring 123, tending to rotate gear 119 in a counterclockwise direction (Fig. 24), said gear being limited in its counterclockwise rotation by arm 120 abutting the stud 118. Arm 120 of gear 119 is so positioned that when the carriage 112 is in its initial position shelf 83 of the classification pawl 82 will contact the end of said arm.

Pivoted to the carriage 112 is a pawl 124, adapted to be held in engagement with the teeth of gear plate 121 by a coil tension spring 124a interconnecting said pawl and the projection 112c when said carriage is moved to the left looking at Fig. 24 in the manner hereinafter explained. Fixed to the plate 110, as by screw 152a, is a bracket 152, having an extension arm 152b, provided with a thumb screw 153 (Figs. 27 and 28). Bracket 152 is so positioned, and the thumb screw 153 may be so adjusted, that when the carriage 112 is in its initial position, pawl 124 will be engaged by the thumb screw 153 to disengage said pawl from the teeth of gear plate 121.

Affixed to portion 112a of the carriage 112, as by screws 125a, is a bracket 125, perpendicular to said carriage and under plate 87 (Figs. 22 and 23). Said bracket 125 comprises two parallel side walls 126 and upwardly extending end walls 127. Journaled in the end walls 127 is a worm 128 extending the entire width of plate 87 and provided with smooth end portions 129a passing through the opening 115 of carriage 112 and an opening 127a in end walls 127. Mounted on the worm 128, and between the side walls 126, is a traveling nut 129, having an upwardly extending arm 130, guided by rods 130a fixed between the end walls 127. The traveling nut 129 is adapted to be positioned by the rotation of the worm 128, thus positioning the arm 130. Arm 130 is adapted to engage any one of the depending projections 93b, 94b, 95b, and 96b of the racks 93, 94, 95, and 96, respectively, dependent upon the position of the traveling nut 129 on the worm 128. Affixed to the worm 128 is a pinion 131 meshing with the gear 119.

When the classification pawl and its pawl block 84 are lowered in the manner heretofore described, shelf 83 engages the arm 120, thus rotating gear 119 in a clockwise direction against the action of spring 123, gear 119 being free to be rotated as pawl 124 is held disengaged from gear plate 121 by the thumb screw 153. The angle through which gear 119 is rotated is dependent upon the extent of downward movement of shelf 83. Pinion 131 is thus rotated in a counterclockwise direction (Fig. 24), rotating the worm 128. The traveling nut 129 is moved along under plate 87 to the particular rack on said plate, the rack selected thus being determined by the particular classification punched in column T2 of the ticket T. Arm 130 is then in a position to engage the depending projection of the selected rack 93, 94, 95, or 96.

When the classification pawl returns to its initial position, arm 120 is freed of shelf 83 thus permitting spring 123 to return the gear 119 to its initial position. Pinion 131 is thus rotated in a clockwise direction, rotating worm 128 to return the traveling nut 129 to its initial position, as shown in Fig. 22.

The extent of operation of pawl 85, or the distance pawl, corresponds to the number of stations which a particular vehicle has traveled over a toll road. The number of stations determines the number of miles which is set up in the toll register C as the multiplicand, as will appear hereinafter and when multiplied by the multiplier already determined by the classification pawl corresponding to the base rate will give the toll to be paid. The multiplication operation is carried out by shifting the carriage 112 from right to left a distance determined by the punched hole in column T3 of the ticket T, and causing said carriage to rotate one of the gears 99, 100, 101, or 102 through the selection of one of the racks 93, 94, 95, or 96.

To this end, therefore, there is affixed to the carriage 112, as by screws 150a, a stepped plate 150, perpendicular to said carriage and having steps 151 equal in number to the ratchet edges of section 38b of the ratchet plate 38 (Figs. 21, 23, and 24). The lengths of the successive steps, however, vary with the distances between the different successive entrance points. For each exit station a slightly different plate 150 is provided. Thus, for station E3 only one step is necessary, while for station E7, three steps would be necessary. Each of these steps would be proportionate in length to the distance between each of the intervening stations.

Referring now to Figs. 26 and 27 there is pivoted to plate 110, as by pin 139, a bell crank 140, having two similar horizontal and parallel members 141, said members having the arms 141a and 141b. Arms 141a are connected by a vertical stop 142, and arms 141b are connected, as by screws 143a, to a stepped member 143. Since stepped member is provided with the steps 144, equal in number to the steps 151 of stepped plate 150. Affixed to arm 141a is a coil tension spring 145, the other end of which is connected to plate 110, said spring tends to rotate the stop means 140 in a counterclockwise direction about the pin 139 (Fig. 26). Arms 141a and 141b are so positioned and so proportioned that stop 142 contacts the edge of the first step of stepped plate 150 (Fig. 21) and so that the topmost step 144 of stepped member 143 contacts the roller 86 (Fig. 25) when said stop means is in its initial position due to the action of spring 145. Steps 144 of member 143 are so proportioned that when roller 86 is in its lowermost position the lowermost step of said member contacts said roller.

There is affixed to the lower arm 141 of the bell crank 140 a ratchet plate 146, having teeth 146a equal in number to the steps of stepped plate 150, and adapted to be rotated with said arm. Pivoted to the plate 110, as at 147a, is a pawl 147, having an extension arm 147b. Said pawl is normally held in engagement with teeth 146a of ratchet 146 by a coil tension spring 148 connected to said pawl, as at 148a, and to plate 110, as at 148b. Pawl 147 is so positioned that when the carriage 112 is in its initial position, stop 112b engages the extension arm 147b, rotating said pawl in a clockwise direction (Fig. 26) against the action of spring 148, thus freeing the ratchet plate 146 from said pawl, permitting the stop means 140 to be rotated.

By lowering the distance pawl in the manner heretofore described, roller 86 will be lowered, thus rotating stop means 140 in a clockwise direction about rod 139 (Fig. 26). By rotating said stop means, stop 142 is positioned with respect to steps 151 of serrated plate 150. By moving carriage 112 slightly to the left, pawl 147 will be disengaged by stop 112b and engage ratchet plate 146. Stop means 140 will thus be held in its rotated position and stop 142 is positioned a number of steps up on plate 150 in accordance to the number of stations a particular vehicle has traveled. Stop 142 is thus in a position to limit the movement of carriage 112 from right to left, by reason of coaction of stop 142 with one of the steps of plate 150.

Means is now provided to move the carriage 112 from right to left, thus permitting arm 130 to carry with it the rack selected by the classification pawl the distance determined by said distance pawl in positioning stop 142 with respect to the steps 151 of serrated plate 150.

To this end, therefore, there is affixed between the side walls 33 and 34 a shaft 132, perpendicular to said side walls (Figs. 5A and 24). Rotatably mounted on said shaft is a lever 134 provided with a cam follower 135 near its median portion. Said lever is connected at its upper end by a coil tension spring 136, anchored to carriage 112, as at 136a. Spring 136 urges lever 134 to rotate in a clockwise direction about shaft 132, pressing said lever into engagement with the stud 117 of said carriage.

Fixed to the shaft 56 is a cam 137, being adapted to be rotated thereby in the manner heretofore described. Cam follower 135 is held in engagement with the periphery of cam 137 by action of a coil tension spring 138 fixed to the lever 134, as at 138a, and to the rod 72. Cam 137 is mounted on shaft 56 so that in rotating said shaft in a counterclockwise direction the ascending portion of the cam will not be engaged by the cam follower 135 until the high point of cam 63 has been reached by its cam follower 66 (Fig. 5a).

In rotating cam 137 in a counterclockwise direction, lever 134 will remain in its initial position until ratchet plate 38 has been moved to its lowermost position. When ratchet plate 38 is in its lowermost position, cam follower 135 will begin to ride over the ascending portion of the cam 137. Lever 134 will thus be rotated in a counterclockwise direction about shaft 132 (Fig. 24), exerting a pulling force on coil spring 136, thus urging carriage 112 to shift from right to left. Pawl 124 disengages the thumb screw 153 and engages the teeth of ratchet plate 121, thus holding gear 119 in the position to which it has been rotated by the operation of the classification pawl. Projection 112b of the carriage 112 disengages the extension 147b of the pawl 147, thus holding the stop 142 in the position to which it has been rotated by the operation of the distance pawl.

The movement of the carriage from right to left will be limited by the position of stop 142 with respect to the steps 151 of serrated plate 150. When a step of serrated plate 150 engages the stop 142, the movement of carriage 112 is halted, the further rotation of lever 134 in a counterclockwise direction due to cam follower 135 riding the ascending portion of cam 137 being absorbed by the coil tension spring 136. The distance travelled by carriage 112 is hence proportional to the sum of the lengths of steps 151 below the step contacted by the stop 142 and is thus proportional to the mileage travelled by a vehicle between the points of entrance and a predetermined exit. Lever 134 will be rotated in a clockwise direction when cam follower 135 rides over the descending portion of the cam 137. Lever 134, contacting stud 117, moves the carriage 112 to its initial position. Pawl 124 engages the thumb screw 153, thus disengaging gear plate 121, permitting gear 119 to be rotated to its initial position by spring 123. Projection 112b of the carriage engages the pawl 147, disengaging said pawl from the ratchet plate 146, permitting stop means 140 to rotate to its initial position by action of spring 145. Member 125 carrying the traveling nut 129 is also carried back by the carriage 112, thus freeing the depending projection of the rack contacted by arm 130. The rack so contacted and the others which might have been moved by the rotation of their respective pinions by shaft 98 are also returned to their initial positions by coil tension springs (not shown) fixed to front wall 31.

In shifting the carriage 112 from right to left, the positioned arm 130 will carry with it the selected rack of the racks 93, 94, 95, or 96 as selected by the classification pawl. The rack so selected will be carried from right to left until the movement of the carriage 112 is halted by a step 151 of the serrated plate 150 contacting the stop 142 as positioned by the distance pawl. The pinion meshing with the rack so shifted will be rotated in a clockwise direction (Fig. 29), thus rotating shaft 98 in the same direction. The angle through which shaft 98 is rotated is dependent upon the size of the pinion so rotated and the initial position of its pin with respect to its corresponding pin 98a, and to the distance through which the particular rack is moved. It is to be noted that the lost motion between the pins and their respective pinions is to prevent the smaller pinions in rotating shaft 98 from running the racks of the larger pinions out of their respective grooves. Shaft 98 will thus rotate the gear sector 103 in a clockwise direction, rotating the shaft 105 in a counterclockwise rotation (Fig. 29). Gear 106 will thus be rotated in the same direction through an angle determined by the rack selected and moved and the limits of such movement.

The degree of rotation of gear 106 is thus proportional to the base rate punched on the ticket times the distance travelled by the vehicle.

Means is further provided to calibrate the angular rotation of the gear 106 into figures representing the toll to be paid by a particular vehicle.

To this end, referring to Figs. 28 and 29, there are provided two similar bearings 180a and 180b fixed to the side wall 33, as by screws 180C, said bearings being in vertical alignment on said side wall. Journaled in each of said bearings 180a and 180b are stud shafts 181a and 181b, respectively. Rotatably mounted on each of said stud shafts is an identical set of digit printing wheels 182a and 182b, each set of wheels being provided with the usual transfer mechanism. Digit wheels 182a are so positioned as to register with the opening formed by the depending portions 37a and 37b of slot 37 and the top of plate 47, while digit wheels 182b register with aperture 46 of the plate 43.

Affixed to the units wheel of each set of the printing wheels 182a and 182b is a pinion 183a and 183b, respectively, said pinions being identically cut and adapted to rotate their respective "units" wheels. Meshing with said pinions and with the gear 106 is an upwardly extending rack 183, having teeth 183C meshing with the gear 106, and teeth 183d meshing with pinions 183a and 183b. By rotating gear 106 in a counterclockwise direction, rack 183 will be moved upwardly, rotating both pinions 183a and 183b in a clockwise direction through identical angles. Printing wheels 182a and 182b are thus rotated until the upward movement of rack 183 is halted by the limited rotation of gear 106. Thus, both sets of printing wheels will then indicate the identical number representing the toll to be paid.

The rotation of gear 106 in a clockwise direction during the return operation of racks 93, 94, 95, and 96, will move rack 183 downwardly rotating the printing wheels to their initial or zeroized position.

It will be noted that in the installation of the toll register C on a highway of the character described, the angular rotation of gear 106 will be different for each of the stations E1, E2, etc., due to the varying distances between the stations.

Means is now provided to print the toll thus computed on the ticket T. To this end there is provided a cam 185 affixed to shaft 56 and adapted to be rotated thereby (Figs. 5A and 20). Rotatably mounted on the shaft 132 is a bell crank 186, having an upwardly extending arm 186a and a rearwardly extending arm 186b. Arm 186a is provided with a cam follower 187 held in engagement with the periphery of cam 185 by action of a coil tension spring 188 interconnecting said arm and the rod 72.

Pivoted within casing 30, as by pin 189, and in the plane with bell crank 186, is a lever 190, having an upwardly extending bent arm 190a, and a depending arm 190b. Arm 190a is provided with an ear 191. Arm 190b has pivotly connected to its lower end a link 192, the other end of said link being pivotly connected to arm 186a of the bell crank 186.

Pivoted to the end of arm 190a, as at 193a, is an arm 193, carrying at its upper end two printthe hammers 194a and 194b, and, near its lower end an ear 195, similar to ear 191 of arm 190a. The lower end of arm 193 is formed with a depending tongue 193b. Ears 191 and 195 are interconnected by a coil tension spring 196, tending to rotate arm 193 in a clockwise direction about pivot 193a, thus causing tongue 193b of said arm to engage the pin 189.

By rotating shaft 56 in a counterclockwise direction, as previously described, cam 185 will be rotated in the same direction. Cam follower 187 riding on the periphery of said cam will rotate bell crank 186 in a counterclockwise direction about the shaft 132, charging the coil tension spring 188. By the rotation of the bell crank 186, lever 190 will be rotated in a clockwise direction about pin 189 due to link 192. Arm 193 is thus rotated in a clockwise direction with lever 90 due to the action of the coil tension spring 196 causing tongue 193b to abut pin 189.

Cam 185 is so affixed to shaft 56 that in rotating said cam in the manner described, cam follower 187 will reach the drop in said cam while carriage 112 is held in its left hand position by action of the cam follower and riding over the high part of cam (Fig. 5A). Thus the printing operation takes place after the printing wheels 182a and 182b have been set to indicate the toll and before said wheels are zeroized.

When the cam follower 187 reaches the drop in cam 185, spring 188 will snap the bell crank 186 in a clockwise direction about shaft 56. Link 192 will snap lever 190 and arm 193 in a counterclockwise direction about pin 189, causing the printing hammers 194a and 194b to move into printing position. Lever 190 will be brought to an abrupt halt due to the abrupt halt of cam follower 187 against the drop of cam 185. The printing hammers, however, due to their inertia, and the spring connection between arm 193 and lever 190, will continue on, passing through the apertures 49, 40, and 46, and the opening provided by the top of plate 48 and the depending portion 37b of the ticket slot 37, striking the ticket T against the printing wheels 182a and 182b, a printing ribbon 200 being interposed. Spring 196 will then snap arm 193 in a clockwise direction about pivot 193a until tongue 193b again abuts the stud 189.

Means is further provided for registering the number of transactions a given exit of the toll road may have.

To this end there is rotatably mounted on the shaft 165 a set of digit wheels 201, having the usual transfer mechanism interposed. The units wheel of the digit wheels 201 is provided with a ratchet wheel 202. Mounted on the rod 171 is a stop pawl 203 held in engagement with the teeth of said ratchet wheel by a coil tension spring 204 connected to said pawl and to the rod 170. Pivotly mounted on shaft 165 is an arm 205 provided with an actuating pawl 206, said pawl being held in engagement with ratchet wheel 202 by a leaf spring 206a. Pivotly connected to the free end of arm 205 is a link 207, said link being pivotly connected at its other end to arm 186b of the bell crank 186.

Each time the cam follower 187 rotates the bell crank 186 in a counterclockwise direction due to the rotation of cam 185, link 207 will rotate arm 205 in a counterclockwise direction, thus advancing the digit wheels 201 one figure. The printing action of cam 185 and its follower 187 will return arm 205 to its initial position as shown in Fig. 20 of the drawings.

Referring now to Figs. 28 and 29, means is provided to register the total tolls paid. To this end there is rotatably mounted on the shaft 165 another set of digit wheels 260 provided with the usual transfer gears. The unit wheel of the said digit wheels is provided with a ratchet wheel 261. Rotatably mounted on the rod 170 is a stop pawl 262, held in engagement with the teeth of ratchet 261 by a coil tension spring 262a affixed to said pawl and to the rod 171. Stop pawl 262 is mounted to prevent the rotation of the ratchet wheel 261, and thus the digit wheels 260 from rotating in a counterclockwise direction.

Rotatably mounted on the shaft 165 is a pinion 263 adapted to rotate the ratchet wheel 261 in a clockwise direction, having the same number and size teeth as the pinion 183a and mounted on shaft 165 as to be in the same plane with said pinion 183a. Slideably mounted within the casing 30, in any suitable manner, is a rack 265 provided at both ends thereof with identical sets of teeth 265a and 265b; teeth 265a meshing with pinion 263, and teeth 265b meshing with pinion 183a.

As pinion 183a is rotated in a clockwise direction by rack 183 to set the printing wheels 182a, rack 265 will be moved from left to right. Pinion 263 will thus be rotated in a clockwise direction, rotating the digit wheels 260 in the same direction. The digit wheels 260 are thus advanced by a figure representing the toll as indicated by the printing wheels 182a and 182b.

After the printing operation has been completed, rack 183 will be moved downwardly, in the manner previously described, thus rotating pinion 193a in a counterclockwise direction. Rack 265 will then be moved from right to left to its initial position, rotating the pinion 263 in a counterclockwise direction. Due to pawl 262 and the mounting of said pinion, the digit wheels 260 will remain in the position to which they have been rotated, thus indicating the total tolls calculated by the register C.

Means is further provided to record the totals thus appearing on the digit wheels 260, as well as the totals appearing on the digit wheels 201 and 169. To this end there is mounted within the casing 30, in any suitable manner, a printing solenoid 270, provided with the printing platen 271 adapted to strike against the said digit wheels. The printing solenoid may be actuated either by a push button or a time switch (not shown) in any of the well known ways, a recording tape and printing ribbon being interposed in the usual manner.

Means is provided to punch the ticket T in column T4 to indicate the particular exit used by the vehicle paying the toll.

Figure 34:
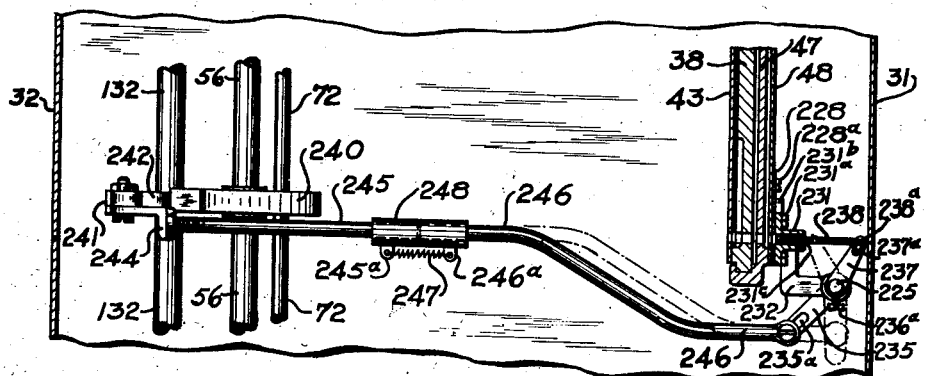
Fig. 34 is a cross-sectional view taken on line 34—34 of Fig. 33.
Figure 33:
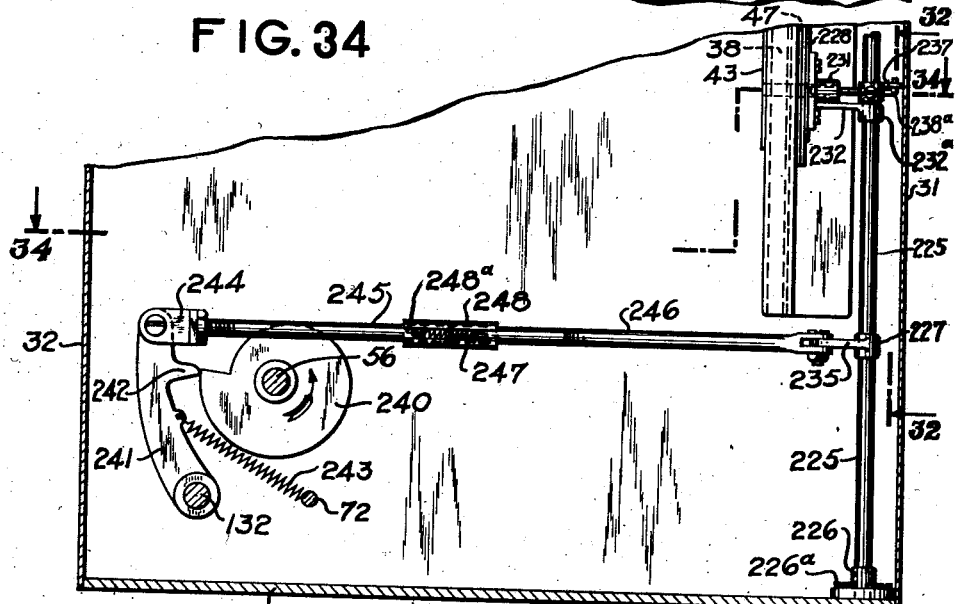
Fig. 33 is an elevational view of the ticket punching mechanism shown in Fig. 5.
Figure 32:
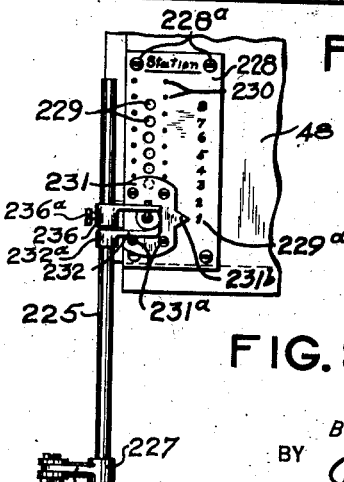
Fig. 32 is a cross-sectional view taken on line 32—32 of Fig. 33.

Referring to Figs. 32 to 34, inclusive, there is mounted on base 36, as by screws 226a, a bearing 226, adjacent the front wall 31. Affixed to plate 48, as by screws 228a, is a plate 228, provided with the aligned through openings 229, said openings registering with the openings 49a, 49b, etc., in plate 48. Plate 228 is further provided with two rows of aligned threaded openings 230, a row of said openings being placed on either side of the through openings 229, and with a column of figures 229a, said figures designating the openings 229 and correspond to the figures of column T4 of the ticket T.

Detachably mounted to plate 228, as by screws 231a threaded in the openings 230, is a bearing plate 231 provided with a through opening 231C, said bearing plate being adapted to be affixed to plate 228 so that opening 231C will register with any desired opening 229. Slideably received within the opening 231C is a punch rod 238 having an upturned ear 238a. Said bearing plate is also provided with a pointer 231b to indicate the particular opening 229 with which the opening 231C is registering, and with an extension arm 232, bearing at its outer end a collar 232a.

Journaled in bearing 226, and rotatably received within the collar 232a, is an upright shaft 225. Affixed to said shaft is a collar 227, having an extension arm 235, said arm being provided with the slotted opening 235a. Affixed to shaft 225, as by a thumb screw 236a, is a collar 236, said collar being provided with an arm 237, provided with a slotted opening 237a. Slideably received within opening 237a is the upturned ear 238a of the punch rod 238. Collar 236 may be moved along shaft 225 to correspond to the position of plate 228 on plate 48, the collar then being made fast by means of thumb screw 236a.

Fixed to the shaft 56 is a cam 240. Rotatably mounted on the shaft 132 is a lever 241 provided with a cam follower 242, said cam follower being held in engagement with the periphery of cam 240 by a coil tension spring 243, fixed to the lever 241 and to rod 72. Pivoted to the upper end of lever 241, as by number 244, is a rod 245 having an ear 245a. Affixed to the end of said rod is a sleeve 248 provided with a longitudinal slot 248a, said slot receiving the ear 245a. Slideably received within the sleeve 248 is a bent rod 246, provided with an ear 246a, said ear being received within the slot 248a of said sleeve. Ears 245a and 246a are interconnected by a coil tension spring 247. Rod 246 is pivoted to arm 235 through the slot 235a of said arm.

In rotating shaft 56, in the manner previously described, cam 240 will be rotated in a counterclockwise direction. In rotating cam 240, the cam follower 242 will ride over the periphery of said cam until the drop in said cam is reached. Lever 241 will thus be rotated in a counterclockwise direction about the shaft 132, charging the spring 243.

Cam 240 is so positioned on the shaft 56 that the drop in said cam is reached by the cam follower 242 an instant after the printing operation, heretofore described, has been completed. (Figs. 5A and 33.)

When cam follower 242 reaches the drop in cam 240, lever 241 will be snapped in a clockwise direction about shaft 132 by the action of the charged spring 243. The action of lever 241 will throw rod 245 to the right, thus contacting the rod 246, thereby propelling rod 246 in the same direction. Rod 246 will continue its motion after rod 245 has been halted by action of the cam follower 242 and cam 240, thus widening the gap between the said two rods and charging the coil tension spring 247.

Arm 235 is thus rotated in a counterclockwise direction (Fig. 34), rotating shaft 225 in the same direction. Collar 236 is thus rotated by said shaft, rotating the arm 237. Punch rod 238 is thrust through an opening 229 and the openings 49, 39, and 45 in plates 48, 38, and 43, respectively, punching the ticket T.

After the ticket punching operation, charged spring 247 will snap rod 246 from right to left, thus rotating shaft 225 in a clockwise direction. Punch rod 238 is quickly withdrawn from plates 48, 38, and 43 and the ticket T, permitting ratchet plate 38 to be moved downwardly by the action of cam follower 66 and cam 63.

Means is also provided to cut the ticket T after the punching and printing operations, heretofore described, and to return the printed receipt portion of said ticket through the return slot 37d; the printed body portion of the ticket being permitted to fall through the ticket slot 37 to the bottom of casing 30.

Referring to Figs. 9 and 17 to 19, inclusive, there is pivoted on the top of frame 47, as by screw 209, a knife 210, having a cutting edge 210a parallel to the plate 43 and provided with the upwardly extending portion 210b. Pivoted to the side wall 33, as by screw 211, is a lever 212, having an upwardly extending arm 212a and a depending arm 212b. Pivoted to the upper end of lever arm 212a is a link 213, the other end of which is pivotally connected to the knife 210.

Rotatably mounted on shaft 132 is an upwardly extending arm 215, said arm being in the same plane as the lever 212. Fixed to said arm at its central point is a cam follower 217. Pivotally connected to the upper end of the arm 215 is a link 216, said link being pivotally connected at its other end to arm 212b of lever 212. Affixed to shaft 56, and adapted to be rotated thereby, is a cam 214. Cam follower 217 is held in engagement with the periphery of said cam by a coil tension spring 218 connected to arm 215 and to the rod 72. Cam 214 is so affixed to the shaft 56 that in rotating said cam in a counterclockwise direction, cam follower 214 engages the high part of said cam after the ticket punching operation previously described has been completed (Figs. 5A and 5B).

As shaft 56 is rotated, in the manner herein described, cam 214 will be rotated in a counterclockwise direction. Cam follower 217 will ride over the periphery of said cam for more than 270° until the ascending portion of said cam is reached. As cam follower 217 rides over the ascending portion of said cam, arm 215 is quickly rotated in a counterclockwise direction about the shaft 132 (Fg. 9), thus moving the link 216 from right to left. Lever 212 will be rotated in a clockwise rotation about screw 211, moving link 213 from left to right. Knife 210 is thus rotated about screw 209 in a clockwise direction (Fig. 17) bringing the cutting edge 210a against the ticket T, severing the receipt portion from the body portion of said ticket.

The further rotation of knife 210 will carry the edge 210a thereof to plate 48. Thus the printed receipt portion of the ticket T is carried to slot 48a by the upwardly extending portion 210b of said knife, the depending portion 37a and 37b of ticket slot 37 aiding in holding the cut edge of the receipt parallel with slot 48a. Thus the receipt portion of ticket T is dropped into slot 48a leading to the return slot 37d in wall 31.

Means is further provided to allow the body portion of the severed ticket T to drop through to the bottom of casing 30.

To this end, referring now the Figs. 15, 18, and 19, there is affixed to the lever 212 an arm 220, perpendicular to said lever. Arm 220 is provided with an ear 220a, parallel to the lever 212 and so placed that it will engage the outward extending portion 51a of the pawl 51 upon rotation of the lever 212.

In rotating lever 212 during the ticket cutting operation, ear 220a will move into engagement with pawl 51, and after the ticket has been cut, the further rotation of lever 212 to carry the severed receipt portion to slot 48a, will rotate pawl 51 in a clockwise direction about its pivot 50a (Fig. 15), against the action of leaf spring 52. The slot between the plates 43 and 38 is thus opened permitting the ticket T to fall through to the bottom of casing 30. The return of lever 212 to its initial position will permit leaf spring 52 to rotate the pawl 51 in a counterclockwise rotation to again seal the bottom of said opening.

While the description of the toll register C, as set forth above, has been illustrated and referred to as a toll calculator for vehicles on a highway, it will be understood that the device herein described is equally applicable in calculating fares or freight charges on railroads, airlines, and buslines. The stepped plate 150 on carriage 112 is provided with steps 151 in the same manner as heretofore described. The length of each step is made proportional to the distance between each station or stop, and the diameters of pinions 99, 100, etc., are made in accordance with the different values of the base rates.

It is also applicable for calculating the wages a workman is to receive, ticket T being provided in this instance with two columns, one column indicating the base pay per hour (or per day) and the other column the number of hours (or number of days), the steps 151 of plate 150 being made in this case of equal length, each step being a definite time interval.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In a toll calculating machine to calculate the toll to be paid for vehicular travel on a road having a purality of stations of entrance and exit, where the toll to be paid depends upon the distance traveled by a vehicle between a point of entrance and a point of exit, multiplied by a base rate depending upon the class of the vehicle, the combination of means to receive a ticket having a perforation, the position of which, relative to a base position on the ticket, indicates the base rate, and a second perforation positioned relative to another base position to indicate the number of stations the entrance station of the vehicle is removed from an initial station, means adapted to be controlled by the ticket to calculate the product of the base rate indicated on the ticket and the mileage between the entrance station indicated on the ticket and an exit station where the vehicle goes off the road, said means comprising a plurality of racks, a pinion on each rack varying in size in accordance with the different base rates, means dependent on the position of the first perforation on said ticket to select one of said racks, and means to move the selected rack a distance dependent upon the position of the second perforation on the ticket.

2. In a toll calculating machine to calculate the toll to be paid for vehicular travel on a road having a plurality of stations of entrance and exit, where the toll to be paid depends upon the distance traveled by a vehicle between a point of entrance and a point of exit, multiplied by a base rate depending upon the class of the vehicle, the combination of means to receive a ticket having a perforation, the position of which, relative to a base position on the ticket, indicates the base rate, and a second perforation positioned relative to another base position to indicate the number of stations the entrance station of the vehicle is removed from an initial station, means adapted to be controlled by the ticket to calculate the product of the base rate indicated on the ticket and the mileage between the entrance station indicated on the ticket and an exit station where the vehicle goes off the road, said means comprising a plurality of racks, a pinion on each rack varying in size in accordance with the different base rates, means dependent on the position of the first perforation on said ticket to select one of said racks, means to move the selected rack a distance dependent upon the position of the second perforation on the ticket, a counter, means controlled by the extent of rotation of the selected pinion to actuate the counter, said means to move the selected rack comprising a member to control the extent of movement of the selected rack, said member having a number of steps equal to the number of stations, said steps being of lengths corresponding to the distances between corresponding stations.

3. In a calculating machine, means to receive a ticket having punched holes, a plurality of parallel racks, pinions of different diameter on a common shaft clutched thereto, and meshing with said racks respectively, means to move said ticket receiving means with the ticket in it, means adapted to engage in one punch hole in the ticket upon moving said receiving means and be moved with said receiving means after said engagement, a traveling carriage movable parallel to said racks, a gear on said carriage having an arm, means on said engaging means to contact said arm to rotate said gear when said engaging means is moved, a worm rotatably mounted on said carriage and disposed transverse to said racks, a travelling nut on said worm, a pinion on said worm meshing with said gear, means on said travelling nut to selectively engage one of said racks, and means to move said carriage for moving one of said racks therewith.

4. In a calculating machine, means to receive a ticket having punched holes, a plurality of parallel racks, pinions of different diameters on a common shaft clutched thereto, and meshing with said racks respectively, means to move said ticket receiving means with the ticket in it, means adapted to engage in one punch hole in the ticket upon moving said receiving means and be moved with said receiving means after said engagement, a travelling carriage movable parallel to said racks, a gear on said carriage having an arm, means on said engaging means to contact said arm to rotate said gear when said engaging means is moved, a worm rotatably mounted on said carriage and disposed transverse to said racks, a travelling nut on said worm, a pinion on said worm meshing with said gear, means on said travelling nut to selectively engage one of said racks, means to move said carriage for moving one of said racks therewith, a stepped member having steps unequal in length in the direction of movement of the carriage, fixed to said carriage, a lever having an arm carrying a stop adapted to engage one of said steps to limit movement of said carriage, a stepped member on the other arm of said lever having steps of substantially similar height, means adapted to engage another punched hole in said ticket and be moved by said receiving means after engagement in said last punched hole, and means on said last engaging means adapted to engage the last stepped member to rotate said lever as said ticket receiving means moves.

5. In a calculating machine, movable means to receive a ticket having a plurality of control formations at different points thereon, a plurality of parallel racks, pinions of different diameters on a common shaft, clutched thereto, and meshing with said racks, respectively, a carriage, a worm on said carriage, transverse of said racks, a travelling nut on said worm, means on said nut to selectively engage one of said racks, means to move said carriage away from initial position parallel to said racks, means controlled by engagement with one of said control formations on the ticket to rotate said worm prior to movement of the carriage, and means controlled by engagement with another of said control formations on the ticket to limit movement of said carriage.

6. In a calculating machine, movable means to receive a ticket having a plurality of control formations at different points thereon, a plurality of parallel racks, pinions of different diameters on a common shaft, clutched thereto, and meshing with said racks, respectively, a carriage, a worm on said carriage, transverse of said racks, a travelling nut on said worm, means on said nut to selectively engage one of said racks, means to move said carriage away from initial position parallel to said racks, means controlled by engagement with one of said control formations on the ticket to rotate said worm, means controlled by engagement with another of said control formations on the ticket to limit movement of said carriage, said carriage moving means including a motor, an output shaft thereon, another shaft, a one revolution clutch connecting said output shaft to said last shaft, a cam on the second shaft, a pivoted member engaged by the cam, a spring interconnecting said pivoted member with said carriage, means to keep the pivoted member engaged with the cam, and means on the pivoted member to contact the carriage and move it back to initial position.

7. In a calculating machine, movable means to receive a ticket having a plurality of control formations at different points thereon, a plurality of parallel racks, pinions of different diameters on a common shaft, clutched thereto, and meshing with said racks, respectively, a carriage, a worm on said carriage, transverse of said racks, a travelling nut on said worm, means on said nut to selectively engage one of said racks, means to move said carriage away from initial position parallel to said racks, means controlled by engagement with one of said control formations on the ticket to rotate said worm prior to movement of said carriage, means controlled by engagement with another of said control formations on the ticket to limit movement of said carriage, means to move the carriage back to initial position, a counter, and means controlled by rotation of said common shaft to operate said counter, including means to zeroize the counter each time the carriage moves back to initial position.

8. In a calculating machine, means to receive a ticket having punched holes, a plurality of parallel racks, pinions of different diameters on a common shaft clutched thereto, and meshing with said racks respectively, means to move said ticket receiving means with the ticket in it, means adapted to engage in one punch hole in the ticket upon moving said receiving means and be moved with said receiving means after said engagement, a travelling carriage movable parallel to said racks, a gear on said carriage having an arm, means on said engaging means to contact said arm to rotate said gear when said engaging means is moved, a worm rotatably mounted on said carriage and disposed transverse to said racks, a travelling nut on said worm, a pinion on said worm meshing with said gear, means on said travelling nut to selectively engage one of said racks, means to move said carriage for moving one of said racks therewith, and means to lock said gear against rotation when said carriage moves away from initial position.

9. In a calculating machine, means to receive a member having a plurality of control formations thereon, a plurality of parallel, slidable racks, a plurality of pinions of different diameters, adapted to correspond to predetermined values, meshing with said racks, a movable carriage, means adapted to be engaged by one of said control formations on said member in the receiving means and be moved to an extent dependent upon the position thereof on member, means on said carriage, controlled by movement of said engaged means, to selectively engage one of said racks, means to move said carriage away from initial position to move the selected rack therewith, a stepped member on the carriage having steps of various lengths in the direction of movement of the carriage, adapted to correspond to other predetermined values, movable stop means adapted to selectively engage one of said steps of said stepped member to limit movement of said carriage, means adapted to be engaged by another of said control formations on said member, and be moved to an extent depending upon the position thereof on said member, and means on said engaged means to selectively position said stop means relative to said stepped member.

10. In combination, a fixed member having a recess, a movable ticket receiving means comprising a pair of plates adapted to receive the ticket therebetween, one of said plates having a through opening, a pin slidably mounted in said through opening and projecting into said recess, spring means to urge said pin toward said member, said pin being adapted to be moved out of said recess and engage a surface of said member, upon movement of said means relative to said member, whereby said pin will press said ticket against said other plate to prevent movement of said ticket relative to said receiving means.

11. In a calculating machine for calculating the product of values represented by a pair of control formations on an article, the position of one of said formations corresponding to one of a set of predetermined arbitrary values, and the position of the other corresponding to one of another set of predetermined arbitrary values, by which value the first value is to be multiplied, the combination of means to receive said article, a set of movable devices in said machine corresponding in number to the number of values in the first set, a second set of devices connected to the devices of the first set, respectively, the devices of the second set being so dimensioned that equal movements of the devices of the first set will cause movement of the devices connected therewith to an extent corresponding to the values of the first set of values, respectively, means controlled by the position of the first formation on said article to select one of the first set of devices, means to move the selected one of the first set of devices, a plurality of stops on said moving means corresponding in number to the number of values in the second set of values, the relative positions of said stops, in one direction, corresponding to the increments in value in the second set of values, a stop means adapted to selectively engage one of said stops to limit movement of said moving means, and means controlled by the position of said other formation on said article to selectively position said stop means.

12. A calculating machine for calculating the product of values represented by a plurality of control formations at different points on an article, the position of one of said formations corresponding to one of one set of predetermined values and the position of the other formation corresponding to one of another predetermined set of values by which the first value is to be multiplied, said machine comprising means to receive said article, a plurality of longitudinally movable racks in said machine, pinions having diameters corresponding in size to the various values of the first set, meshing with said racks respectively, said pairs of meshing racks and pinions corresponding in number to the number of values in the first set, means in the machine to select one of said racks depending upon the position of said first means of said article, upon inserting said article into said receiving means, means for moving the selected rack a distance dependent upon the value corresponding to the position of the other of said formations on said article.

BENJAMIN COOPER.